United States Patent
Joshi et al.

(10) Patent No.: US 11,885,498 B2
(45) Date of Patent: Jan. 30, 2024

(54) TURBINE ENGINE WITH FUEL SYSTEM INCLUDING A CATALYTIC REFORMER

(71) Applicant: GENERAL ELECTRIC COMPANY, Schenectady, NY (US)

(72) Inventors: Narendra D. Joshi, Schenectady, NY (US); Lawrence B. Kool, Niskayuna, NY (US); Joseph Zelina, Waynesville, OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 17/588,876

(22) Filed: Jan. 31, 2022

(65) Prior Publication Data

US 2023/0243505 A1 Aug. 3, 2023

(51) Int. Cl.
| F23R 3/34 | (2006.01) |
| F23R 3/40 | (2006.01) |
| F02C 9/40 | (2006.01) |
| F23R 3/36 | (2006.01) |
| F02C 7/22 | (2006.01) |
| F23R 3/28 | (2006.01) |

(52) U.S. Cl.
CPC .............. *F23R 3/40* (2013.01); *F02C 7/22* (2013.01); *F02C 9/40* (2013.01); *F23R 3/34* (2013.01); *F23R 3/36* (2013.01); *F23R 3/28* (2013.01)

(58) Field of Classification Search
CPC .. F23R 3/34; F23R 3/343; F23R 3/346; F23R 3/36; F23R 3/40; F02C 3/20; F02C 7/22; F02C 9/40
See application file for complete search history.

(56) References Cited

U.S. PATENT DOCUMENTS

| 3,077,073 | A | | 2/1963 | Kuhrt | |
| 4,053,257 | A | * | 10/1977 | Rahaim | F01D 9/042 |
| | | | | | 415/217.1 |
| 5,012,640 | A | | 5/1991 | Mirville | |
| 5,048,284 | A | * | 9/1991 | Lywood | B01J 8/0453 |
| | | | | | 60/39.12 |
| 5,052,176 | A | | 10/1991 | Labatut et al. | |
| 5,101,622 | A | | 4/1992 | Bond | |
| 6,189,310 | B1 | | 2/2001 | Kalitventzeff et al. | |
| 6,579,061 | B1 | * | 6/2003 | Heyward | F01D 5/143 |
| | | | | | 29/889.22 |
| 6,672,832 | B2 | * | 1/2004 | Leeke | F01D 5/143 |
| | | | | | 416/193 A |

(Continued)

OTHER PUBLICATIONS

Lefebvre Arthur, Gas Turbine Combustion, 2010 by Taylor and Francis Group, LLC, Third Edition, pp. 391-393.*

*Primary Examiner* — William H Rodriguez
(74) *Attorney, Agent, or Firm* — McGarry Bair PC (57) ABSTRACT

A gas turbine engine with a compressor section, a turbine section, and a combustion section located downstream from the compressor section and upstream from the turbine section, the combustion section including a dome inlet, a combustor outlet fluidly coupled to the turbine section, a liner and a dome assembly together at least partially defining a combustion chamber extending between the dome inlet and the combustor outlet, a fuel system fluidly coupled to the combustion section, the fuel system comprising a fuel supply, a primary fuel line fluidly coupling the fuel supply to the combustion section, and a reformer fluidly coupled to the fuel supply.

20 Claims, 7 Drawing Sheets

(56) References Cited

U.S. PATENT DOCUMENTS

| | | | |
|---|---|---|---|
| 6,868,676 B1 * | 3/2005 | Haynes | F23R 3/20 60/776 |
| 7,162,864 B1 | 1/2007 | Schefer et al. | |
| 7,975,489 B2 * | 7/2011 | Joshi | F23N 5/242 60/777 |
| 8,931,283 B2 | 1/2015 | Khan et al. | |
| 9,422,889 B2 | 8/2016 | Conrardy et al. | |
| 10,837,641 B2 | 11/2020 | Ogata et al. | |
| 11,578,871 B1 * | 2/2023 | Joshi | F23R 3/346 |
| 2003/0097843 A1 * | 5/2003 | Sugarmen | F02C 1/08 60/39.12 |
| 2003/0215762 A1 * | 11/2003 | Retallick | F23N 1/002 431/12 |
| 2010/0095649 A1 * | 4/2010 | Blouch | F23R 3/36 60/39.463 |
| 2010/0175379 A1 | 7/2010 | Liu et al. | |
| 2011/0314825 A1 * | 12/2011 | Stryapunin | F23R 3/34 60/737 |
| 2013/0298563 A1 * | 11/2013 | Haynes | F23R 3/346 60/740 |
| 2015/0321155 A1 * | 11/2015 | Kim | C10L 3/00 48/89 |
| 2015/0362194 A1 * | 12/2015 | Ogata | F23R 3/286 60/39.463 |
| 2018/0179961 A1 * | 6/2018 | Lavertu, Jr. | F02C 3/305 |
| 2019/0162414 A1 | 5/2019 | Ogata et al. | |
| 2021/0139160 A1 | 5/2021 | Kool et al. | |

\* cited by examiner

TURBINE ENGINE WITH FUEL SYSTEM INCLUDING A CATALYTIC REFORMER

TECHNICAL FIELD

The present subject matter relates generally to a gas turbine engine with a fuel system, more specifically to a combustor having a fuel system fed by a primary fluid line and a secondary fuel line.

BACKGROUND

Turbine engines are driven by a flow of combustion gases passing through the engine to rotate a multitude of turbine blades. A combustor can be provided within the gas turbine engine and is fluidly coupled with a turbine into which the combusted gases flow.

The use of hydrocarbon fuels in the combustor of a gas turbine engine is known. Generally, air and fuel are fed to a combustion chamber, the air and fuel are mixed, and then the fuel is burned in the presence of the air to produce hot gas. The hot gas is then fed to a turbine where it cools and expands to produce power. By-products of the fuel combustion typically include environmentally harmful toxins, such as nitrogen oxide and nitrogen dioxide (collectively called $NO_x$), CO, UHC (e.g., methane and volatile organic compounds that contribute to the formation of atmospheric ozone), and other oxides, including oxides of sulfur (e.g., $SO_2$ and $SO_3$).

Varieties of fuel for use in combustion turbine engines are being explored. Hydrogen or hydrogen mixed with another element or compound can be used for combustion, however hydrogen or a hydrogen mixed fuel can result in a higher flame temperature than traditional fuels. That is, hydrogen or a hydrogen mixed fuel typically has a wider flammable range and a faster burning velocity than traditional fuels such petroleum-based fuels, or petroleum and synthetic fuel blends.

Standards stemming from air pollution concerns worldwide regulate the emission of oxides of nitrogen ($NO_x$), unburned hydrocarbons (UHC), and carbon monoxide (CO) generated as a result of the gas turbine engine operation. In particular, nitrogen oxide ($NO_x$) is formed within the combustor as a result of high combustor flame temperatures during operation. It is desirable to decrease $NO_x$ emissions while still maintaining desirable efficiencies by regulating the profile and or pattern within the combustor.

BRIEF DESCRIPTION OF THE DRAWINGS

A full and enabling disclosure of the present disclosure, including the best mode thereof, directed to one of ordinary skill in the art, is set forth in the specification, which makes reference to the appended figures, in which.

DETAILED DESCRIPTION

Aspects of the disclosure described herein are directed to a combustor, and in particular turbine engine with a combustor fed by a fuel system having a primary and secondary fuel line and fluidly coupled to a catalytic endothermic reformer. For purposes of illustration, the present disclosure will be described with respect to a gas turbine engine. It will be understood, however, that aspects of the disclosure described herein are not so limited and that a combustor as described herein can be implemented in engines, including but not limited to turbojet, turboprop, turboshaft, and turbofan engines. Aspects of the disclosure discussed herein may have general applicability within non-aircraft engines having a combustor, such as other mobile applications and non-mobile industrial, commercial, and residential applications.

The word "exemplary" is used herein to mean "serving as an example, instance, or illustration." Any implementation described herein as "exemplary" is not necessarily to be construed as preferred or advantageous over other implementations. Additionally, unless specifically identified otherwise, all embodiments described herein should be considered exemplary.

As used herein, the terms "first", "second", and "third" may be used interchangeably to distinguish one component from another and are not intended to signify location or importance of the individual components.

The terms "forward" and "aft" refer to relative positions within a gas turbine engine or vehicle, and refer to the normal operational attitude of the gas turbine engine or vehicle. For example, with regard to a gas turbine engine, forward refers to a position closer to an engine inlet and aft refers to a position closer to an engine nozzle or exhaust.

As used herein, the term "upstream" refers to a direction that is opposite the fluid flow direction, and the term "downstream" refers to a direction that is in the same direction as the fluid flow. The term "fore" or "forward" means in front of something and "aft" or "rearward" means behind something. For example, when used in terms of fluid flow, fore/forward can mean upstream and aft/rearward can mean downstream.

The term "fluid" may be a gas or a liquid. The term "fluid communication" means that a fluid is capable of making the connection between the areas specified.

Additionally, as used herein, the terms "radial" or "radially" refer to a direction away from a common center. For example, in the overall context of a gas turbine engine, radial refers to a direction along a ray extending between a center longitudinal axis of the engine and an outer engine circumference.

All directional references (e.g., radial, axial, proximal, distal, upper, lower, upward, downward, left, right, lateral, front, back, top, bottom, above, below, vertical, horizontal, clockwise, counterclockwise, upstream, downstream, forward, aft, etc.) are only used for identification purposes to aid the reader's understanding of the present disclosure, and do not create limitations, particularly as to the position, orientation, or use of aspects of the disclosure described herein. Connection references (e.g., attached, coupled, connected, and joined) are to be construed broadly and can include intermediate structural elements between a collection of elements and relative movement between elements unless otherwise indicated. As such, connection references do not necessarily infer that two elements are directly connected and in fixed relation to one another. The exemplary drawings are for purposes of illustration only and the dimensions, positions, order and relative sizes reflected in the drawings attached hereto can vary.

The singular forms "a", "an", and "the" include plural references unless the context clearly dictates otherwise. Furthermore, as used herein, the term "set" or a "set" of elements can be any number of elements, including only one.

Approximating language, as used herein throughout the specification and claims, is applied to modify any quantitative representation that could permissibly vary without resulting in a change in the basic function to which it is related. Accordingly, a value modified by a term or terms, such as "about", "approximately", "generally", and "substantially", are not to be limited to the precise value specified. In at least some instances, the approximating language may correspond to the precision of an instrument for measuring the value, or the precision of the methods or machines for constructing or manufacturing the components and/or systems. In at least some instances, the approximating language may correspond to the precision of an instrument for measuring the value, or the precision of the methods or machines for constructing or manufacturing the components and/or systems. For example, the approximating language may refer to being within a 1, 2, 4, 5, 10, 15, or 20 percent margin in either individual values, range(s) of values and/or endpoints defining range(s) of values. Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

Figure 1:
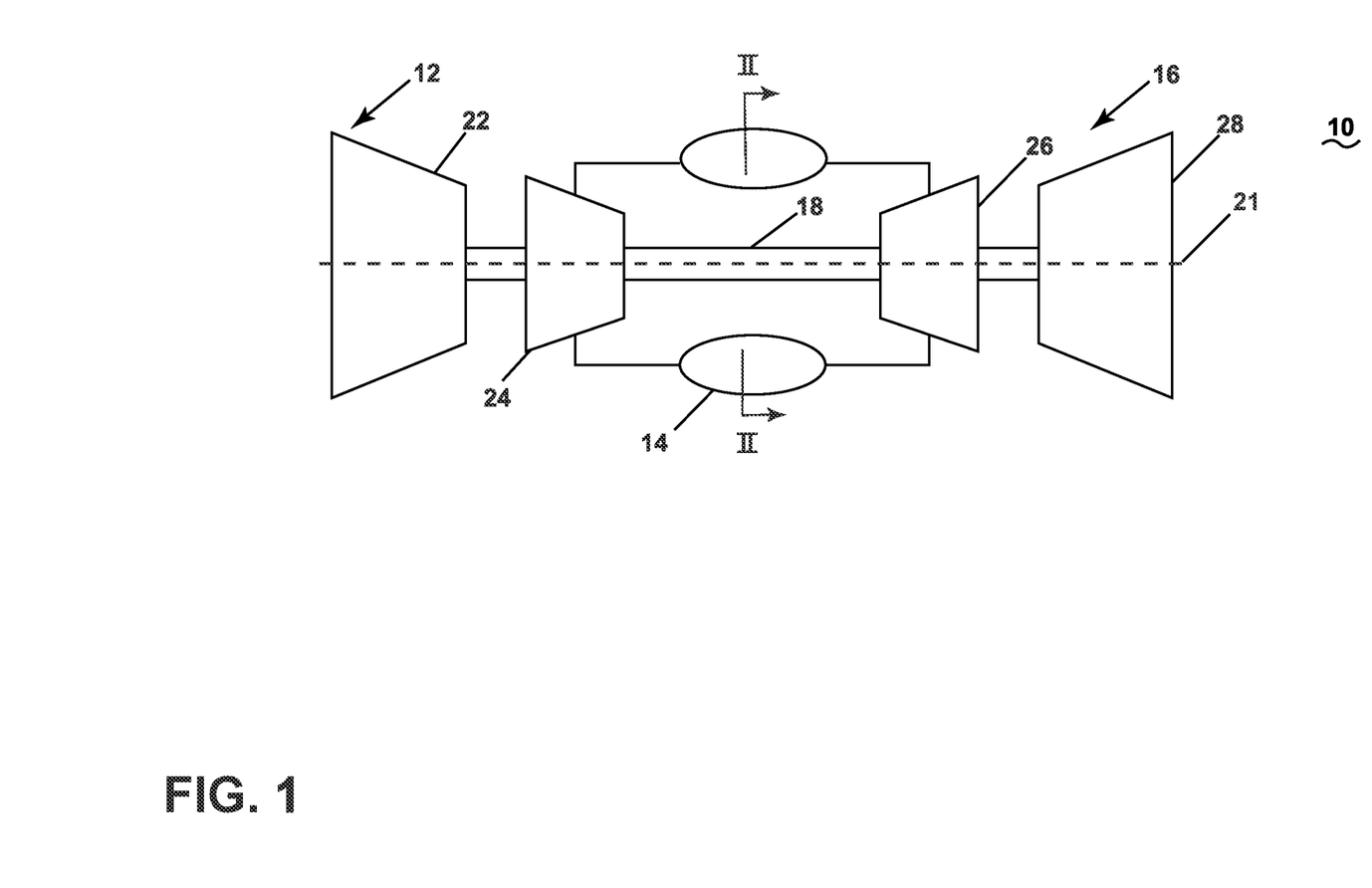
FIG. 1 is a schematic of a gas turbine engine.

FIG. 1 is a schematic view of a gas turbine engine 10. As a non-limiting example, the gas turbine engine 10 can be used within an aircraft. The gas turbine engine 10 can include, at least, a compressor section 12, a combustion section 14, and a turbine section 16. A drive shaft 18 rotationally couples the compressor and turbine sections 12, 16, such that rotation of one affects the rotation of the other, and defines a rotational axis or centerline 21 for the gas turbine engine 10.

The compressor section 12 can include a low-pressure (LP) compressor 22, and a high-pressure (HP) compressor 24 serially fluidly coupled to one another. The turbine section 16 can include an LP turbine 26, and an HP turbine 28 serially fluidly coupled to one another. The drive shaft 18 can operatively couple the LP compressor 22, the HP compressor 24, the LP turbine 26 and the HP turbine 28 together. Alternatively, the drive shaft 18 can include an LP drive shaft (not illustrated) and an HP drive shaft (not illustrated). The LP drive shaft can couple the LP compressor 22 to the LP turbine 26, and the HP drive shaft can couple the HP compressor 24 to the HP turbine 28. An LP spool can be defined as the combination of the LP compressor 22, the LP turbine 26, and the LP drive shaft such that the rotation of the LP turbine 26 can apply a driving force to the LP drive shaft, which in turn can rotate the LP compressor 22. An HP spool can be defined as the combination of the HP compressor 24, the HP turbine 28, and the HP drive shaft such that the rotation of the HP turbine 28 can apply a driving force to the HP drive shaft which in turn can rotate the HP compressor 24.

The compressor section 12 can include a plurality of axially spaced stages. Each stage includes a set of circumferentially-spaced rotating blades and a set of circumferentially-spaced stationary vanes. The compressor blades for a stage of the compressor section 12 can be mounted to a disk, which is mounted to the drive shaft 18. Each set of blades for a given stage can have its own disk. The vanes of the compressor section 12 can be mounted to a casing which can extend circumferentially about the gas turbine engine 10. It will be appreciated that the representation of the compressor section 12 is merely schematic and that there can be any number of stages. Further, it is contemplated, that there can be any other number of components within the compressor section 12.

Similar to the compressor section 12, the turbine section 16 can include a plurality of axially spaced stages, with each stage having a set of circumferentially-spaced, rotating blades and a set of circumferentially-spaced, stationary vanes. The turbine blades for a stage of the turbine section 16 can be mounted to a disk which is mounted to the drive shaft 18. Each set of blades for a given stage can have its own disk. The vanes of the turbine section can be mounted to the casing in a circumferential manner. It is noted that there can be any number of blades, vanes and turbine stages as the illustrated turbine section is merely a schematic representation. Further, it is contemplated, that there can be any other number of components within the turbine section 16.

The combustion section 14 can be provided serially between the compressor section 12 and the turbine section 16. The combustion section 14 can be fluidly coupled to at least a portion of the compressor section 12 and the turbine section 16 such that the combustion section 14 at least partially fluidly couples the compressor section 12 to the turbine section 16. As a non-limiting example, the combustion section 14 can be fluidly coupled to the HP compressor 24 at an upstream end of the combustion section 14 and to the HP turbine 28 at a downstream end of the combustion section 14.

During operation of the gas turbine engine 10, ambient or atmospheric air is drawn into the compressor section 12 via a fan (not illustrated) upstream of the compressor section 12, where the air is compressed defining a pressurized air. The pressurized air can then flow into the combustion section 14 where the pressurized air is mixed with fuel and ignited, thereby generating combustion gases. Some work is extracted from these combustion gases by the HP turbine 28, which drives the HP compressor 24. The combustion gases are discharged into the LP turbine 26, which extracts additional work to drive the LP compressor 22, and the exhaust gas is ultimately discharged from the gas turbine engine 10 via an exhaust section (not illustrated) downstream of the turbine section 16. The driving of the LP turbine 26 drives the LP spool to rotate the fan (not illustrated) and the LP compressor 22. The pressurized airflow and the combustion gases can together define a working airflow that flows through the fan, compressor section 12, combustion section 14, and turbine section 16 of the gas turbine engine 10.

Figure 2:
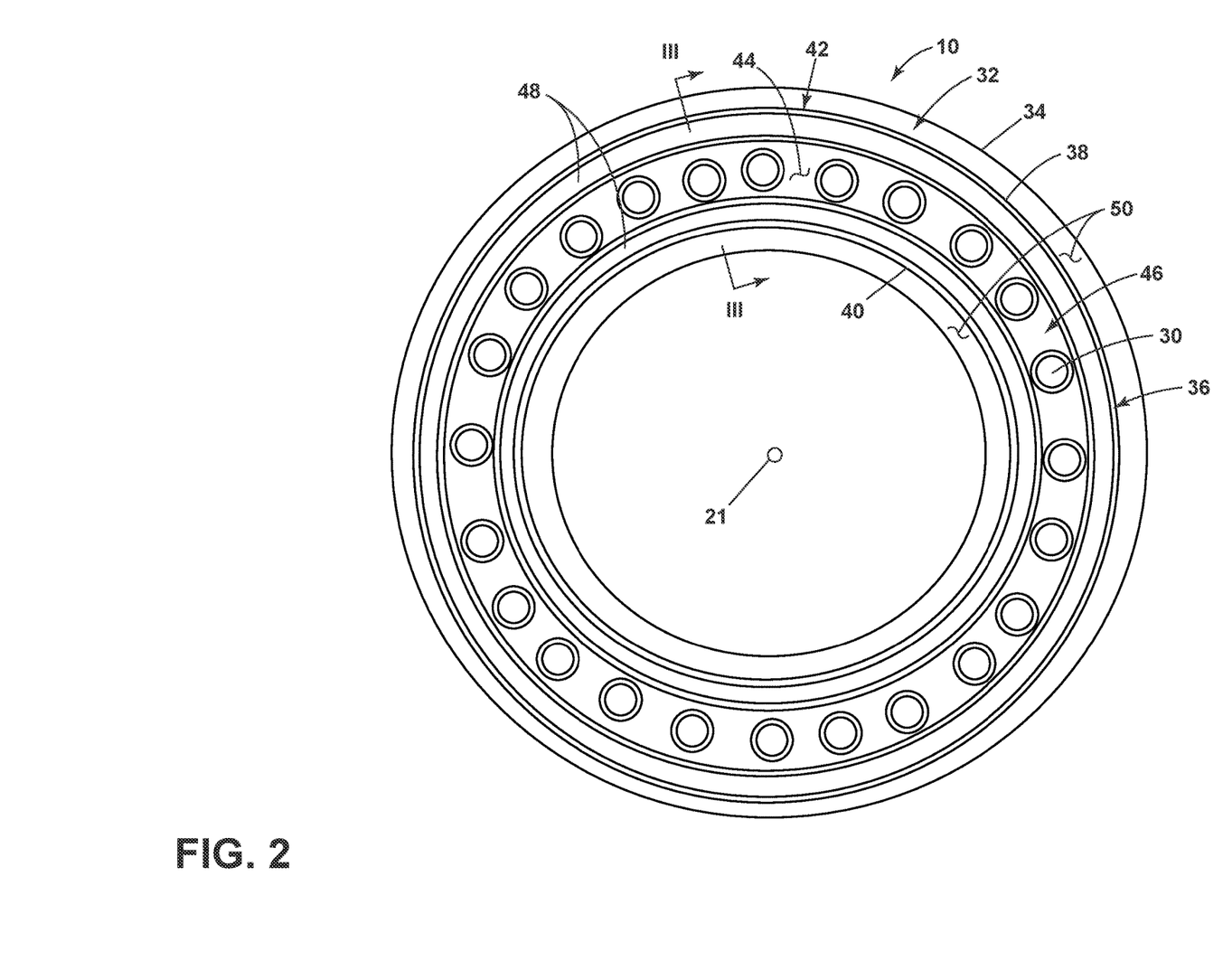
FIG. 2 depicts a cross-section view along line II-II of FIG. 1 of a combustion section of the gas turbine engine.

FIG. 2 depicts a cross-section view of the combustion section 14 along line II-II. The combustion section 14 can include an annular arrangement of primary fuel injectors 30 disposed around the centerline 21 of the gas turbine engine 10. Each of the primary fuel injectors 30 can be connected to a combustor 32. It should be appreciated that the annular arrangement of fuel injectors can be one or multiple fuel injectors and one or more of the primary fuel injectors 30 can have different characteristics. The combustor 32 can have a can, can-annular, or annular arrangement depending on the type of engine in which the combustor 32 is located. In a non-limiting example, an annular arrangement is illustrated and disposed within a casing 34. The combustor 32 is defined by a combustor liner 36 including an outer combustor liner 38 and an inner combustor liner 40 concentric with respect to each other and annular about the engine centerline 21. A dome assembly 42 including a dome wall 44 together with the combustor liner 38 can define a combustion chamber 46 annular about the engine centerline 21. A first set of dilution openings 48 can be located in the dome wall 44. At least one primary fuel injector 30, illustrated as multiple primary fuel injectors annularly arranged about the engine centerline 21, is fluidly coupled to the combustion chamber 46. A compressed air passageway 50 can be defined at least in part by both the combustor liner 36 and the casing 34.

Figure 3:
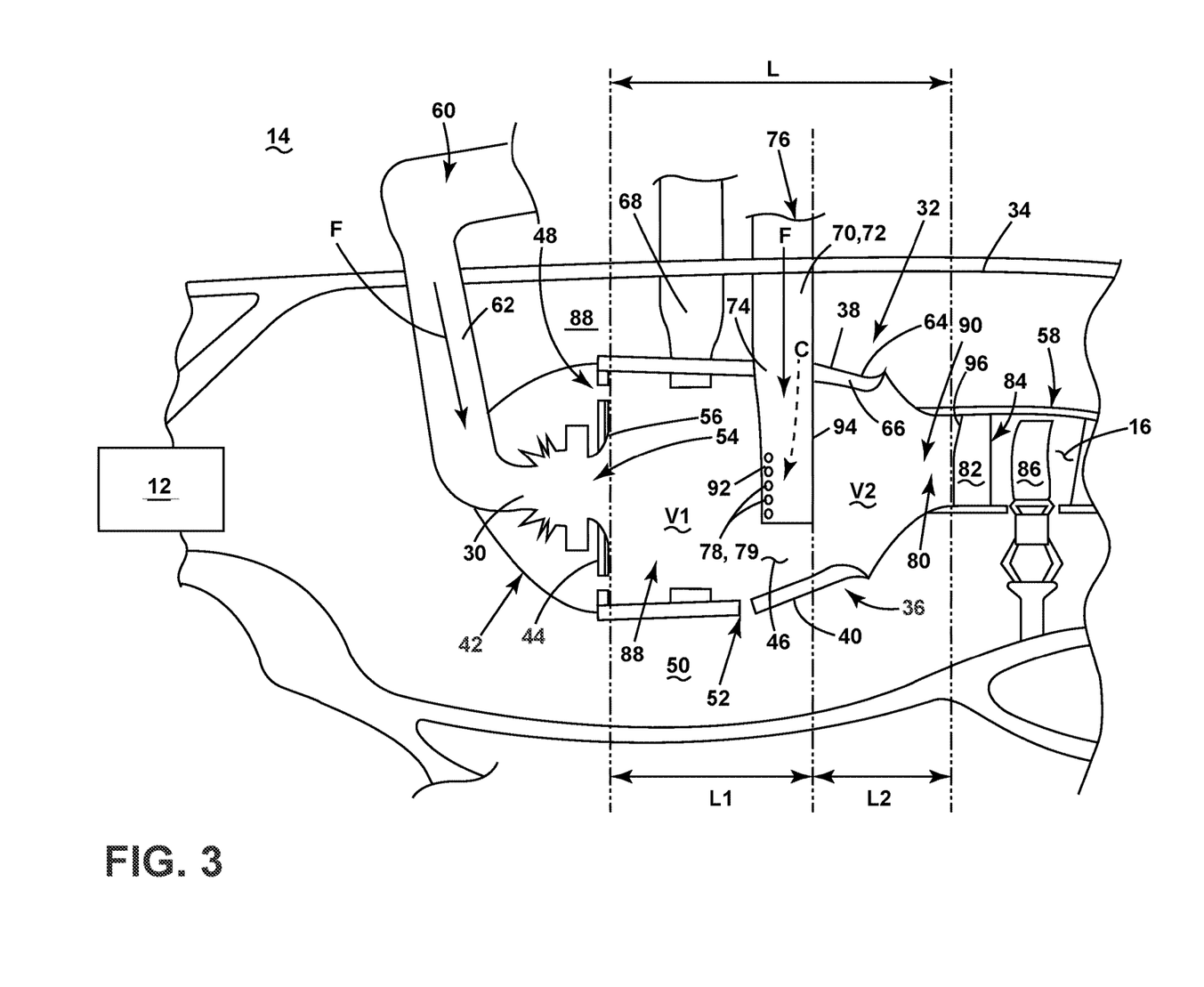
FIG. 3 is a cross-section view of a combustor in the combustion section taken along line III-III of FIG. 2 and having a primary fuel injector and a second fuel injector according to an aspect of the disclosure herein.

FIG. 3 depicts a cross-section view taken along line of FIG. 1 illustrating the combustion section 14. A second set of dilution openings 52 can be located in the combustor liner 36, connecting the compressed air passageway 50 and the combustor 32. It should be understood that any number of dilution openings can be part of the first and/or second set of dilution openings 48, 52.

The primary fuel injector 30 can be coupled to and disposed within the dome assembly 42 upstream from a primary fuel/air mixture outlet 54 defined by a flare cone 56. The primary fuel/air mixture outlet 54 can define a dome inlet such that the primary fuel/air mixture outlet and dome inlet are one in the same, referred to herein as the dome inlet 54. The primary fuel injector 30 can include a fuel inlet 60 that can be adapted to receive a flow of fuel (F) and a fuel passageway 62 extending between the fuel inlet 60 and the primary fuel/air mixture outlet 54. The first set of dilution openings 48 can define a swirler provided at the dome inlet 54 to swirl incoming compressed air (C) in proximity to a fuel/air mixture exiting the primary fuel injector 30. The swirler can both provide a homogeneous mixture of air and fuel entering the combustor 32 along with contribute to cooling of the combustor liner 36.

Both the outer and inner combustor liners 38, 40 can have an outer surface 64 and an inner surface 66 at least partially defining the combustion chamber 46. The combustor liner 36 can be made of one continuous monolithic portion or be multiple monolithic portions assembled together to define the outer and inner combustor liners 38, 40. By way of non-limiting example, the outer surface 64 can define a first piece of the combustor liner 36 while the inner surface 66 can define a second piece of the combustor liner 36 that when assembled together form the combustor liner 36. It is further contemplated that the combustor liner 36 can be any type of combustor liner 36, including but not limited to a double walled liner or a tile liner. An igniter 68 can be provided at any suitable location including at the combustor liner 36 and fluidly coupled to the combustion chamber 46, at any location, by way of non-limiting example downstream from the dome inlet 54.

A structural element 70 can extend into the combustion chamber 46 downstream from the primary fuel injector 30. The structural element 70 can be any structural element, by way of non-limiting example a strut. The structural element 70 can include internal cooling passages and mechanisms and/or high temperature material as needed to enable placement of the structural element in the path of combustion gasses (G1) generated in the combustion chamber 46. The structural element 70 can further extend between the casing 34 and the outer combustor liner 38. The structural element 70 can define a housing for a fuel passageway 72 for a second fuel injector 74. The fuel passageway 72 can include a fuel inlet 76 that can be adapted to receive another flow of fuel (F). A set of openings 78 can define a secondary fuel/air mixture outlet 79 for air and fuel exiting the second fuel injector 74. The set of openings 78 can be a single opening or multiple openings radially spaced along the structural element 70 as illustrated. It is further contemplated that the set of openings 78 is arranged along a leading edge of the structural element 70, referred to herein as a structural element leading edge 92.

A combustor outlet 80 fluidly couples the combustor 32 to the turbine section 16. A set of vanes 82 circumferentially spaced about the engine centerline 21 (FIG. 2) can define a nozzle 84 for the turbine section 16. A set of blades 86 is circumferentially spaced about the engine centerline 21 and located downstream from the set of vanes 82. Together the set of vanes 82 with the set of blades 86 define a first stage 58 of the turbine section 16. In one aspect of the disclosure herein the set of vanes 82 are uncooled. By "uncooled" the vanes defining the sets 82 are without cooling cavities, cooling holes, or other cooling features fluidly connected to cooling air. It is further contemplated that any of the set of vanes 82 and/or the set of blades 86 are cooled and/or made of ceramic material.

The structural element 70 can divide the combustion chamber 46 into a primary zone 88 having a first volume (V1) and a secondary zone 90 having a second volume (V2). The primary zone 88 can have a first length (L1) measured axially from the dome wall 44 to a trailing edge of the structural element, referred to herein as a structural element trailing edge 94. The secondary zone 90 can have a second length (L2) measured axially from the structural element trailing edge 94 to a leading edge 96 of the set of vanes 82. In one aspect of the disclosure herein a total length (L) of the combustor 32 is less than a typical combustion length. The first length (L1) is less than or equal to twice the second length (L2) such that the primary zone 88 is smaller than a typical primary zone for a combustor.

Figure 4:
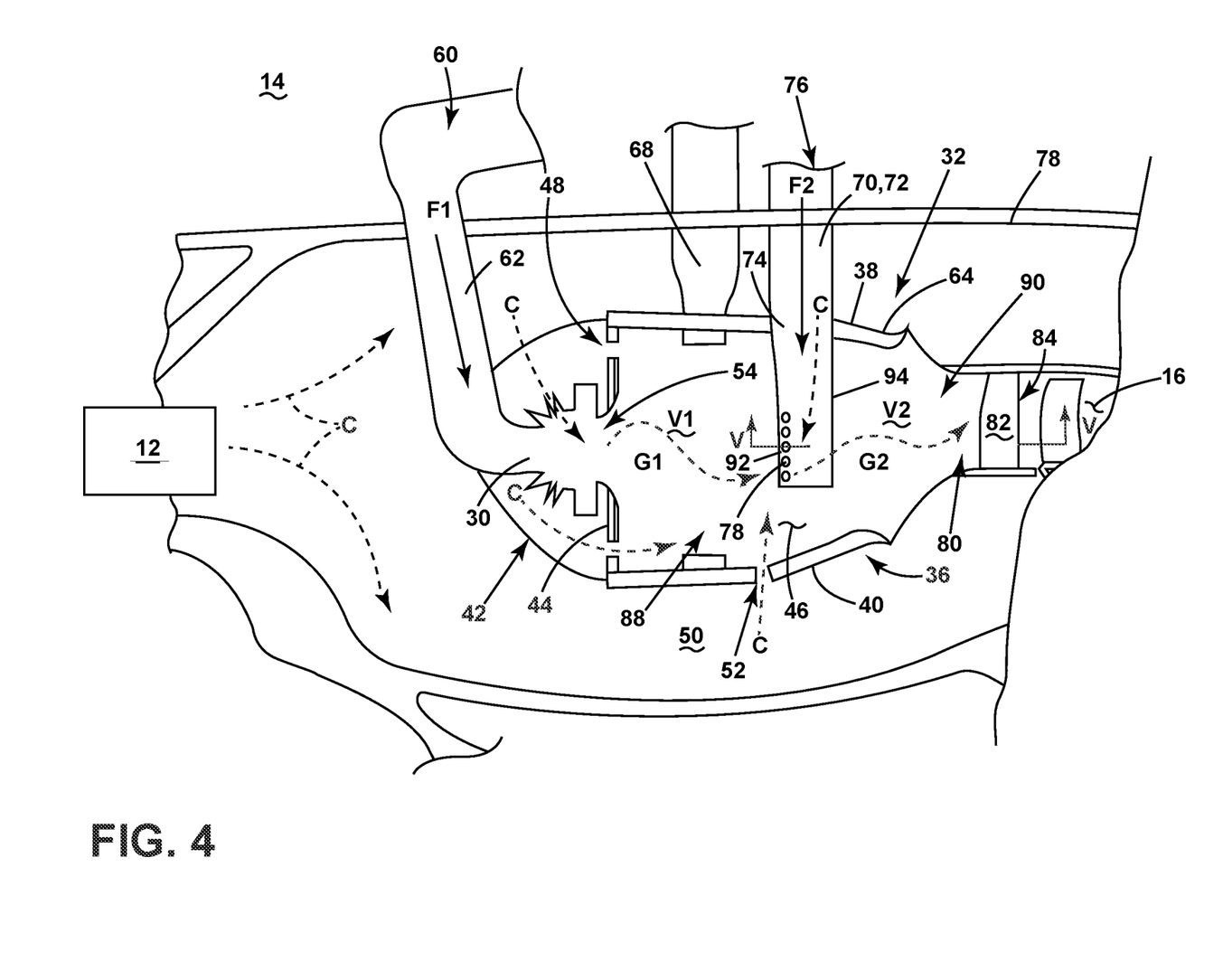
FIG. 4 is the cross-section of FIG. 3 with some numbers removed to illustrate the combustor during operation according to an aspect of the disclosure herein.

Turning to FIG. 4, the same schematic from FIG. 3 with some numbers removed for clarity, the combustor 32 during operation is illustrated. Compressed air (C) can flow from the compressor section 12 to the combustor 32 through the dome assembly 42. Compressed air (C) can flow from the compressor section 12 to the combustor 32 through the compressed air passageway 50. The second set of dilution openings 52 in the combustor liner 36 allow passage of some of the compressed air (C) from the compressed air passageway 50 to the combustion chamber 46. Another portion of compressed air (C) can flow through the first set of dilution openings 48. The compressed air (C) received in the combustor 32 via the dilution openings 48, 52 can be swirled, utilized to mix the fuel/air mixture, for cooling of the combustor liner 36, and/or to provide dilution within the combustion chamber 46.

The first volume (V1) of the combustion chamber 46 is sized and derived from an altitude relight Dahmkohler number (Da) necessary to provide a sufficient temperature rise to restart the gas turbine engine 10. A Dahmkohler number (Da) is the ratio of reaction rate to transport rate. In other words, a Dahmkohler number (Da) greater than one is associated with a higher rate of combustion than a rate of movement of the combustion gas through the combustor 32. For the combustion chamber 46, the Dahmkohler number is greater than one (Da>1). At least a portion of the compressed air (C) can flow through the primary fuel injector 30. A first amount of fuel (F1) can be injected at the primary fuel injector 30 and be mixed with the compressed air (C). The first amount of fuel (F1) can be hydrogen fuel, or any hydrocarbon fuel, including jet fuel. Upon entering the combustor 32, the mixture is ignited within the combustion chamber 46 by one or more igniters 68 to generate combustion gas (G1). The combustion gas (G1) can be mixed as previously described, to define a first portion of combustion gasses (G1) that rise in temperature to a first amount (T1). The first volume (V1) is sized to enable the first portion of combustion gasses (G1) to reach a maximum temperature. When the set of vanes 82 define an uncooled nozzle 84 a maximum temperature of 1800° F. (982° C.) applies. The first volume (V1) enables all of the air in the combustion gasses (G1) to mix and produce a temperature with a 1800° F. (982° C.) limit. When the set of vanes 82 define a cooled nozzle 84, or when the set of vanes 82 are manufactured with non-metallics, this maximum temperature can be increased. For example, ceramic materials can provide a limit of 2700° F. (1482° C.). Therefore, the maximum temperature can be 1800° F. (982° C.) for an uncooled nozzle 84 and 2700° F. (1482° C.) when utilizing advanced non-metallics or cooling technologies for the nozzle 84. When turbine nozzle 84 is actively cooled then the maximum temperature could approach 3400° F. (1871° C.). Increasing the maximum temperature can decrease performance of the gas turbine engine 10 due to utilizing bleed air for cooling. Therefore, providing an uncooled nozzle 84 in combination with sizing the first volume (V1) to decrease the maximum temperature can increase engine performance.

A second amount of fuel (F2), by way of non-limiting example hydrogen fuel, can be injected at the second fuel injector 74 and be mixed with yet another portion of compressed air (C). The mixture can exit the set of openings 78 as fuel/air mixture which can be ignited to generate a second portion of combustion gasses (G2) that can flow through the combustor outlet 80 and into the turbine section 16 via the nozzle 84. The second portion of combustion gas (G2) can rise in temperature to a second amount (T2) greater than the first amount (T1). The second fuel injector 74 can be utilized for providing a required temperature rise for takeoff and cruise.

Figure 5:
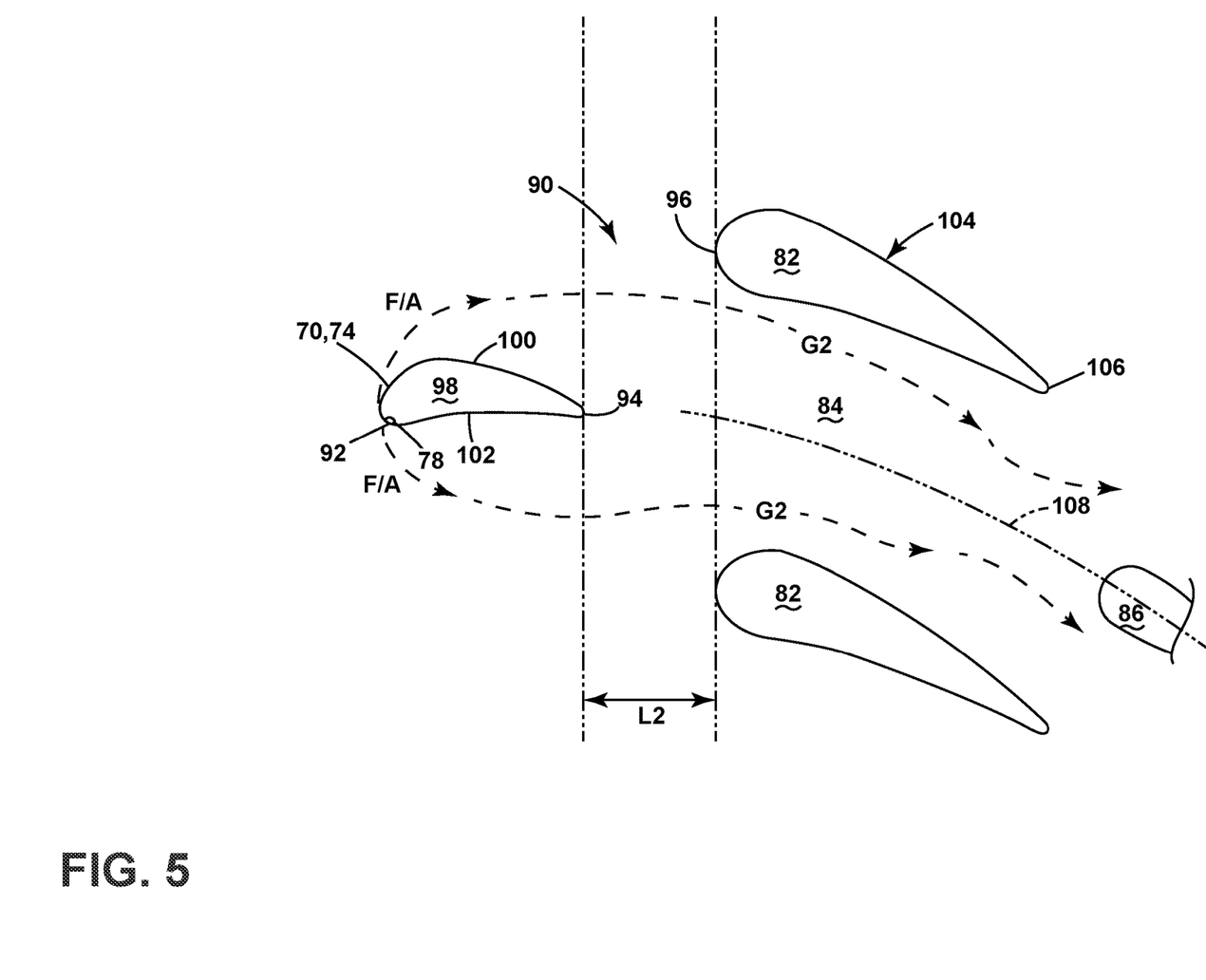
FIG. 5 is a cross-section view along line V-V of FIG. 4 illustrating a streamline extending from the second fuel injector to a first set of vanes according to an aspect of the disclosure herein.

Turning to FIG. 5, a schematic of the secondary zone 90 taken along line V-V in FIG. 4 is illustrated. The structural element 70 can have an airfoil shape 98 and extend in a downstream direction between the structural element leading edge 92 and the structural element trailing edge 94. Further, the airfoil shape 98 can have a first side 100 and a second side 102 opposite the first side 100 and extending between the structural element leading edge 92 and the structural element trailing edge 94. Each vane in the set of vanes 82 can also have an airfoil shape 104 and extend downstream between the leading edge 96 and a trailing edge 106.

A fuel/air mixture (F/A) exits the set of openings 78 to define the second portion of combustion gas (G2). The fuel/air mixture (F/A) can exit on one or both sides 100, 102 of the structural element 70. The second portion of combustion gas (G2) can rise to the second amount (T2) in excess of 1800° F. (982° C.) to 3400° F. (1870° C.). The second portion of combustion gas (G2) passes through the nozzle 84 at temperatures equal to or between 1800° F. (982° C.) and 3400° F. (1870° C.). The location of the set of openings 78 along with the angle and positioning of the set of vanes 82 are oriented to form a streamline 108 central to the nozzle 84 along which the combustion gasses (G2) can flow. This prevents the high temperature combustion gasses (G2) from touching the set of vanes 82, which enable the utilization of vanes that are uncooled as described herein. All burning occurs between turbine vanes 82 thereby providing sufficient temperature rise to the turbine blades 86.

Figure 6:
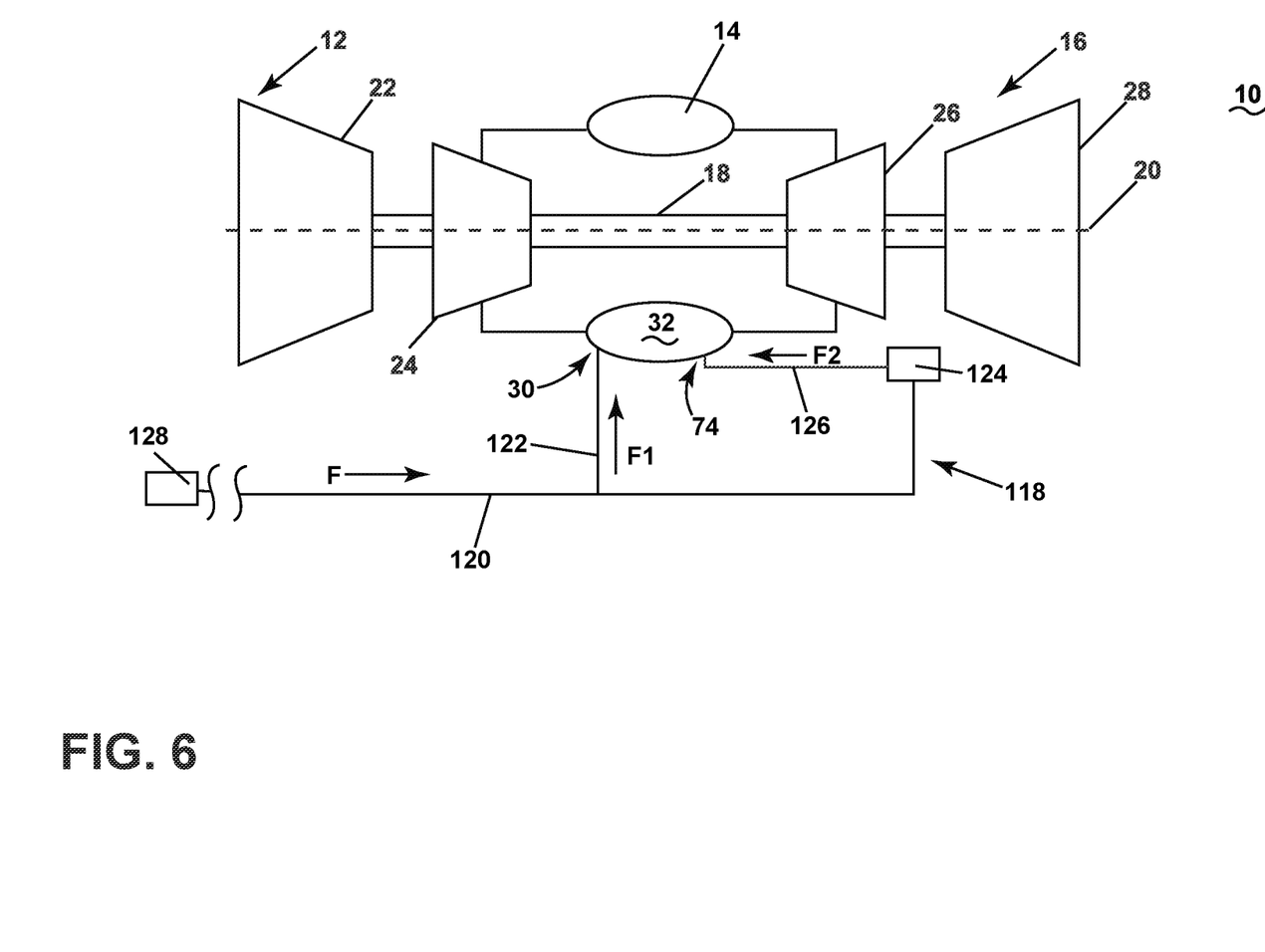
FIG. 6 is the schematic from FIG. 1 with a fuel system according to an aspect of the disclosure herein.

FIG. 6 illustrates a fuel system 118 for the engine 10 described herein. The fuel system 118 includes a main fuel line 120 fluidly coupled to a primary fuel line 122 and a secondary fuel line 126. The primary fuel line 122 is fluidly connected to the primary fuel injector 30. A catalytic endothermic reformer 124 is fluidly coupled to the secondary fuel line 126 downstream from the primary fuel line 122. The catalytic endothermic reformer 124 can be located in the turbine section 16 upstream from the HP turbine 28 and downstream from the LP Turbine 26. The secondary fuel line 126 fluidly couples the catalytic endothermic reformer 124 to the second fuel injector 74. A liquid fuel supply 128 is fluidly coupled to the main fuel line 120. The liquid fuel supply 128 can be filled with hydrogen, ethylene, methane, or any other suitable hydrocarbon liquid fuel.

Figure 7:
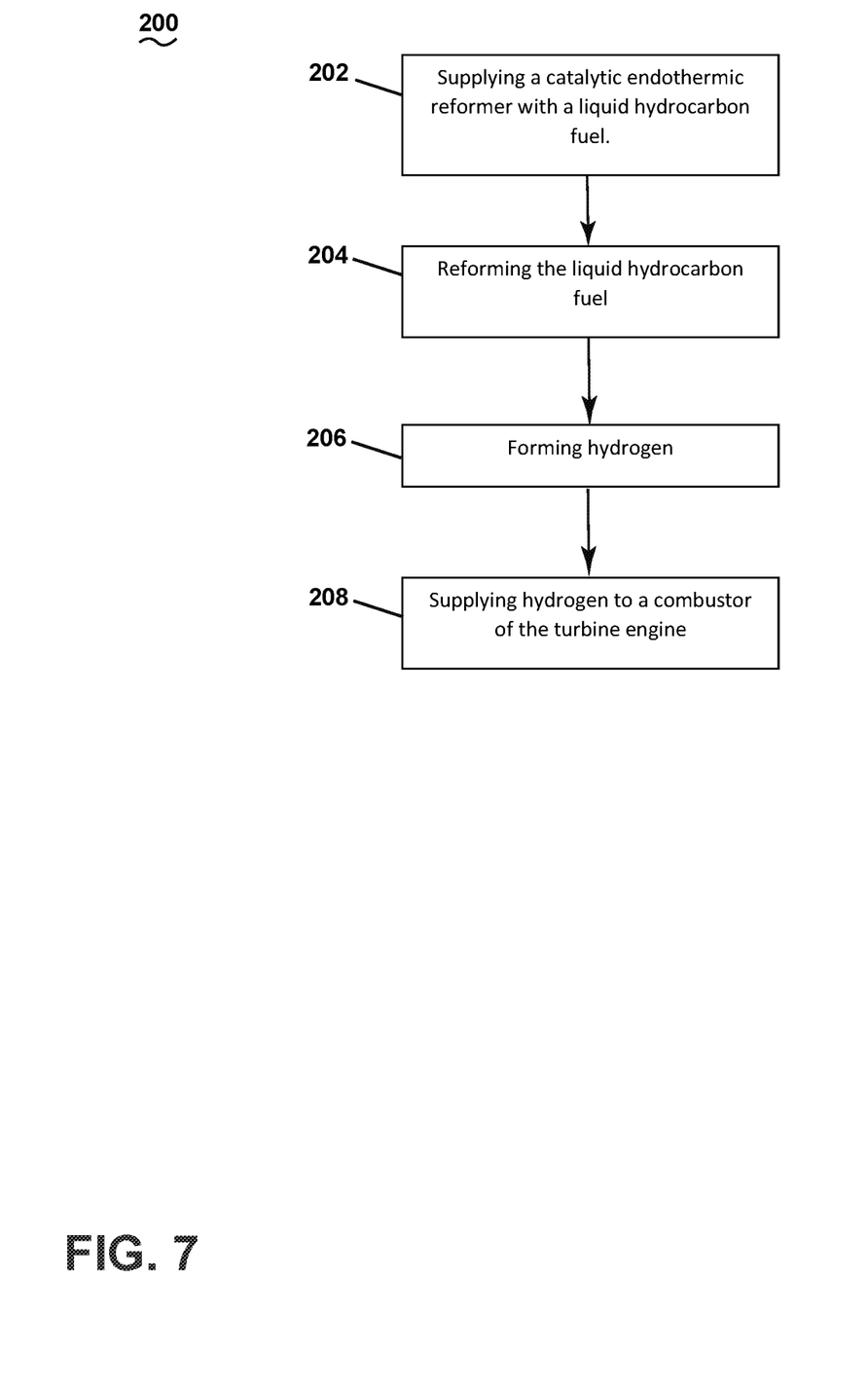
FIG. 7 is a flow chart for a method of supplying the engine of FIG. 6 with a reformed fuel according to an aspect of the disclosure herein.

Turning to FIG. 7, in one aspect of the disclosure herein, a method 200 of supplying a reformed hydrocarbon fuel includes at block 202 supplying the catalytic endothermic reformer 124 with fuel from the liquid fuel supply 128. The liquid fuel can then be reformed at block 204 in the catalytic endothermic reformer 124 to form small organic molecules and hydrogen at block 206. The reforming process can take place at, between 815° C. and 925° C. (1499° F.-1697° F.). In some implementations, or at or near 850° C. (1562° F.). The second amount of fuel (F2) can be a reformed fuel including hydrogen that can be supplied at block 208 via the secondary fuel line 126 to the second fuel injector 74. In one aspect of the disclosure herein, the second fuel injector 74 is a reformed gaseous fuel injector.

In a gas turbine engine 10 without the catalytic endothermic reformer 124 described herein, both fuel injectors 30, 74 can be fed directly with hydrogen fuel. The catalytic endothermic reformer 124 enables multiple fuel use, or just hydrogen fuel use. In one non-limiting example the primary fuel injector provides liquid hydrocarbon fuel and the second fuel injector 74 supplies reformed fuel that has passed through the secondary fuel line 126. It is further contemplated that with the catalytic endothermic reformer 124, both fuel injectors 30, 74 can be supplied by the reformed fuel passing through the secondary fuel line 126. The fuel supplied to the catalytic endothermic reformer 124 can be any aliphatic hydrocarbon that is easily and efficiently reformed.

A method for controlling nitrogen oxides, or $NO_x$ present in combustion gases (G) within the combustor 32, includes injecting fuel/air mixture into the primary zone 88 as described herein. Further, the method can include injecting the fuel/air mixture into the secondary zone 90 via the second fuel injector 74. The method can further include burning the fuel in the secondary zone 90 to produce the second portion of combustion gasses (G2). The second portion of combustions gasses (G2) can then flow from the secondary zone 90 into at least a portion of the first stage 58 of the turbine section 16. Further, the method can include controlling a flow of the second portion of combustion gasses (G2) through the nozzle 84 in order to prevent the second portion of combustion gasses (G2) from contacting the set of vanes 82.

Benefits associated with the disclosure herein include, but are not limited to lowering $NO_x$ emissions and increasing efficiency of the engine 10. The catalytic endothermic reformer enables chemical recuperation of heat improving the engines thermodynamic efficiency. A late injection of the reformed fuel through the second fuel injector 74 enables lower $NO_x$ emissions along with utilizing uncooled vanes 82 and/or blades 86 in the first stage 58 while meeting all of the engine operability requirements. Further, a smaller temperature rise in the primary zone 88 with respect to a typical temperature rise for a combustor enables lower $NO_x$ emissions, enhanced engine operability and altitude relight. Furthermore, a total length (L) of the combustor 32 is shorter than a typical combustor length. This reduction of length (L) of the primary zone results in an overall engine length reduction which enables weight reduction.

Generally, the use of hydrogen as a fuel can reduce the combustor volume significantly since the fuel already exists as a gas. There is no length of time needed for evaporation, mixing is fast, and reaction rates are high. The reformer described herein provides an infrastructure for utilizing hydrogen fuel without the need of carrying hydrogen onboard which could require a large and heavy system. Any weight increase the infrastructure for the reformer requires can be offset by the engine length and weight reduction provided by decreasing the combustor volume and length.

It should be appreciated that the dilution openings as described herein are exemplary as illustrated. The dilution openings can be organized in a myriad of different ways, and can include by way of non-limiting example ribs, pin banks, circuits, sub-circuits, film-openings, plenums, mesh, and turbulators, of any shape or size. The dilution openings can include other flow enhancing devices, by way of non-limiting example a small opening located behind the dilution opening. It is further contemplated that the dilution openings can be part of a collection of dilution openings. It is also contemplated that the dilution openings can be in addition to and separate from a collection of cooling openings located along the combustor liner.

While described with respect to a gas turbine engine, it should be appreciated that the combustor as described herein can be for any engine with a having a combustor that emits $NO_x$. It should be appreciated that application of aspects of the disclosure discussed herein are applicable to engines with propeller sections or fan and booster sections along with turbojets and turbo engines as well.

To the extent not already described, the different features and structures of the various embodiments can be used in combination, or in substitution with each other as desired. That one feature is not illustrated in all of the embodiments is not meant to be construed that it cannot be so illustrated, but is done for brevity of description. Thus, the various features of the different embodiments can be mixed and matched as desired to form new embodiments, whether or not the new embodiments are expressly described. All combinations or permutations of features described herein are covered by this disclosure.

This written description uses examples to describe aspects of the disclosure described herein, including the best mode, and also to enable any person skilled in the art to practice aspects of the disclosure, including making and using any devices or systems and performing any incorporated methods. The patentable scope of aspects of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

Further aspects are provided by the subject matter of the following clauses:

A gas turbine engine, comprising: a compressor section; a turbine section; a combustion section located downstream from the compressor and upstream from the turbine and having combustion chamber extending between a dome inlet and a combustor outlet; and a fuel system fluidly coupled to the combustion section, the fuel system comprising: a fuel supply, a primary fuel line fluidly coupling the fuel supply to the combustion section, a catalytic endothermic reformer fluidly coupled to the fuel supply, and a secondary fuel line fluidly coupling the catalytic endothermic reformer to the combustion section.

The gas turbine engine of any preceding clause, further comprising a primary fuel injector fluidly coupling the primary fuel line to the combustion chamber at the dome inlet.

The gas turbine engine of any preceding clause, further comprising a second fuel injector fluidly coupling the secondary fuel line to the combustion chamber at a location downstream of the dome inlet and upstream of the combustor outlet.

The gas turbine engine of any preceding clause, further comprising a structural element defining a fuel passageway for the second fuel injector and extending through the liner at least partially into the combustion chamber.

The gas turbine engine of any preceding clause, further comprising a set of openings radially spaced along the structural element and defining an outlet of the second fuel injector.

The gas turbine engine of any preceding clause wherein the fuel supply is a liquid fuel supply.

The gas turbine engine of any preceding clause wherein the secondary fuel line provides a reformed gaseous fuel.

The gas turbine engine of any preceding clause, further comprising a structural element defining a second fuel injector and extending at least partially into the combustion chamber, the structural element separating the combustion chamber into a primary zone downstream from the primary fuel injector and a secondary zone downstream from the second fuel injector.

The gas turbine engine of any preceding clause, further comprising a set of vanes located downstream of the combustor outlet, wherein a first length defining the primary zone and measured along axially between the dome inlet and leading edge of the set of vanes is less than or equal to twice a second length defining the secondary zone and measured axially between the trailing edge of the structural element and the leading edge of the set of vanes.

A fuel system for a gas turbine engine having a combustor, the fuel system comprising: a fuel supply; a primary fuel line fluidly coupling the fuel supply to the combustor; a catalytic endothermic reformer fluidly coupled to the fuel supply; and a secondary fuel line fluidly coupling the catalytic endothermic reformer to the combustion section.

The fuel system of any preceding clause, further comprising a primary fuel injector fluidly coupling the primary fuel line to the combustor.

The fuel system of any preceding clause, further comprising a second fuel injector fluidly coupling the secondary fuel line to the combustor at a location downstream from the primary fuel injector.

The fuel system of any preceding clause wherein the fuel supply is a liquid fuel supply.

The fuel system of any preceding clause wherein the secondary fuel line provides a reformed gaseous fuel.

A method of supplying a reformed hydrocarbon fuel in a gas turbine engine, the method comprising: supplying a catalytic endothermic reformer with a liquid hydrocarbon fuel; reforming the liquid hydrocarbon fuel; forming a hydrogen fuel; supplying the hydrogen fuel to a combustor of The gas turbine engine.

The method of any preceding clause, further comprising supplying a fuel to a primary zone of the combustor.

The method of any preceding clause, further comprising supplying the hydrogen fuel to a secondary zone of the combustor downstream from the primary zone.

The method of any preceding clause, further comprising raising a temperature in the primary zone a first amount.

The method of any preceding clause, further comprising burning the hydrogen fuel in the secondary zone downstream from the primary zone.

The method of any preceding clause, further comprising raising the temperature in the secondary zone a second amount greater than the first amount.

What is claimed is:

1. A gas turbine engine, comprising:
   a compressor section;
   a turbine section;
   a combustion section located downstream from the compressor section and upstream from the turbine section and having a combustion chamber extending between a dome inlet and a combustor outlet;
   a primary fuel injector fluidly coupled to the dome inlet;
   a second fuel injector fluidly coupled to the combustion chamber at a location downstream of the dome inlet and upstream of the combustor outlet;
   a structural element defining the second fuel injector and extending radially at least partially into the combustion chamber and axially between a structural element leading edge and a structural element trailing edge, the structural element separating the combustion chamber into a primary zone downstream from the primary fuel injector and a secondary zone downstream of the structural element trailing edge, wherein the structural element includes a set of openings arranged along the structural element leading edge; and
   a fuel system fluidly coupled to the combustion section, the fuel system comprising:
      a fuel supply;
      a primary fuel line fluidly coupling the fuel supply to the primary fuel injector;
      a catalytic endothermic reformer fluidly coupled to the fuel supply; and
      a secondary fuel line fluidly coupling the catalytic endothermic reformer to the second fuel injector.

2. The gas turbine engine of claim 1, wherein the structural element defines a fuel passageway extending through a liner defining at least a portion of the combustion chamber.

3. The gas turbine engine of claim 2, wherein the set of openings are radially spaced along the structural element and define an outlet of the second fuel injector.

4. The gas turbine engine of claim 1 wherein the fuel supply is a liquid fuel supply.

5. The gas turbine engine of claim 1 wherein the secondary fuel line provides a reformed gaseous fuel.

6. The gas turbine engine of claim 1, further comprising a set of vanes located downstream of the combustor outlet, wherein a first length defining the primary zone and measured axially between the dome inlet and the structural element trailing edge is less than or equal to twice a second length defining the secondary zone and measured axially between the structural element trailing edge and a leading edge of the set of vanes.

7. The gas turbine engine of claim 6 wherein the set of vanes define a nozzle.

8. The gas turbine engine of claim 7 wherein the set of openings are located in the structural element with an orientation configured to form a streamline central to the nozzle.

9. The gas turbine engine of claim 1, wherein the primary zone has a first length determined by an altitude relight Dahmkohler number for producing a first temperature in the primary zone.

10. The gas turbine engine of claim 9, wherein the secondary zone has a second length for producing a second temperature greater than the first temperature.

11. The gas turbine engine of claim 10 wherein the first length is less than or equal to twice the second length.

12. A fuel system for a gas turbine engine having a combustor, the fuel system comprising:
   a fuel supply;
   a combustion chamber extending between a dome inlet and a combustor outlet;
   a primary fuel injector fluidly coupled to the dome inlet;
   a second fuel injector fluidly coupled to the combustion chamber at a location downstream of the dome inlet and upstream of the combustor outlet;
   a structural element defining the second fuel injector and extending radially at least partially into the combustion chamber and axially between a structural element leading edge and a structural element trailing edge, the structural element separating the combustion chamber into a primary zone downstream from the primary fuel injector and a secondary zone downstream of the structural element trailing edge, wherein a first length defining the primary zone and measured axially between the dome inlet and the structural element trailing edge is less than or equal to twice a second length defining the secondary zone and measured axially between the structural element trailing edge and a leading edge of a downstream set of vanes;
   a set of openings radially spaced along the structural element, defining an outlet of the second fuel injector, and arranged along the structural element leading edge;
   a primary fuel line fluidly coupling the fuel supply to the primary fuel injector;
   a catalytic endothermic reformer fluidly coupled to the fuel supply; and
   a secondary fuel line fluidly coupling the catalytic endothermic reformer to the second fuel injector.

13. The fuel system of claim 12, wherein the fuel supply is a liquid fuel supply.

14. The fuel system of claim 12, wherein the secondary fuel line provides a reformed gaseous fuel.

15. The fuel system of claim 12, wherein the first length is determined by an altitude relight Dahmkohler number for producing a first temperature in the primary zone and the second length enables a second temperature greater than the first temperature.

16. The fuel system of claim 12 wherein the set of openings are located in the structural element with an orientation configured to form a streamline central to the downstream set of vanes.

17. A method of supplying a reformed hydrocarbon fuel in a gas turbine engine, the method comprising:
   supplying a liquid hydrocarbon fuel to a primary fuel injector of a combustor of the gas turbine engine;

supplying a primary zone of the combustor with a fuel/air mixture from the primary fuel injector;

supplying a catalytic endothermic reformer with a liquid hydrocarbon fuel;

reforming the liquid hydrocarbon fuel to form a hydrogen fuel;

supplying the hydrogen fuel to a structural element defining a second fuel injector downstream of the primary fuel injector;

supplying a secondary fuel/air mixture from a set of openings arranged along the structural element leading edge toward the primary zone of the combustor of the gas turbine engine;

igniting the secondary fuel/air mixture to generate a second portion of combustion gasses; and flowing the second portion of combustion gasses through a secondary zone of the combustor and into a turbine section of the gas turbine engine along a streamline formed by the set of openings and a set of vanes in the turbine section.

18. The method of claim 17, further comprising raising a temperature in the primary zone a first amount.

19. The method of claim 18, further comprising burning the hydrogen fuel in the secondary zone downstream from the primary zone.

20. The method of claim 19, further comprising raising the temperature in the secondary zone a second amount greater than the first amount.

* * * * *